(12) United States Patent
Saito et al.

(10) Patent No.: US 11,871,106 B2
(45) Date of Patent: Jan. 9, 2024

(54) IMAGING APPARATUS, IMAGING METHOD, AND PROGRAM

(71) Applicant: FUJIFILM Corporation, Tokyo (JP)

(72) Inventors: Taro Saito, Saitama (JP); Takehiro Koguchi, Saitama (JP); Yukinori Nishiyama, Saitama (JP); Tomoharu Shimada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/896,482

(22) Filed: Aug. 26, 2022

(65) Prior Publication Data
US 2022/0408028 A1    Dec. 22, 2022

Related U.S. Application Data

(63) Continuation of application No. PCT/JP2021/006659, filed on Feb. 22, 2021.

(30) Foreign Application Priority Data

Feb. 28, 2020    (JP) .................................. 2020-033964

(51) Int. Cl.
*H04N 23/63* (2023.01)
*H04N 23/53* (2023.01)
(Continued)

(52) U.S. Cl.
CPC ......... *H04N 23/633* (2023.01); *H04N 23/531* (2023.01); *H04N 23/611* (2023.01); *H04N 23/667* (2023.01)

(58) Field of Classification Search
CPC .. H04N 23/633; H04N 23/531; H04N 23/611; H04N 23/667; G03B 17/04; G03B 17/18; G03B 17/20
See application file for complete search history.

(56) References Cited

U.S. PATENT DOCUMENTS

2010/0134676 A1    6/2010    Miyanishi
2017/0054916 A1    2/2017    Sato et al.

FOREIGN PATENT DOCUMENTS

JP        2010-134077 A    6/2010
JP        2014-38190 A     2/2014
(Continued)

OTHER PUBLICATIONS

International Preliminary Report on Patentability (Form PCT/IPEA/409) for International Application No. PCT/JP2021/006659, dated Nov. 24, 2021, with an English translation.
(Continued)

*Primary Examiner* — Yogesh K Aggarwal
(74) *Attorney, Agent, or Firm* — Birch, Stewart, Kolasch & Birch, LLP

(57) ABSTRACT

Provided are an imaging apparatus, an imaging method, and a program that change a display form of a display unit in accordance with whether or not a display content of the display unit is visually recognizable. An imaging apparatus (10) includes a first display unit (13), and a processor (40), in which the processor (40) performs a determination process for determining whether or not a display content of the first display unit (13) is visually recognizable by a user, and a display control for displaying a first display including at least one of a captured image or a character in a case where it is determined through the determination process that the display content is visually recognizable, and for causing the first display unit (13) to display a second display that is a surface display in a case where it is not determined through the determination process that the display content is visually recognizable.

16 Claims, 14 Drawing Sheets

(51) Int. Cl.
*H04N 23/611* (2023.01)
*H04N 23/667* (2023.01)

(56) References Cited

FOREIGN PATENT DOCUMENTS

| | | | |
|---|---|---|---|
| JP | 2015-227902 A | | 12/2015 |
| JP | 2018-125802 A | | 8/2018 |
| JP | 2018125802 A | * | 8/2018 |
| JP | 2019-134334 A | | 8/2019 |

OTHER PUBLICATIONS

International Search Report (Form PCT/ISA/210) for International Application No. PCT/JP2021/006659, dated Jun. 1, 2021, with an English translation.

* cited by examiner

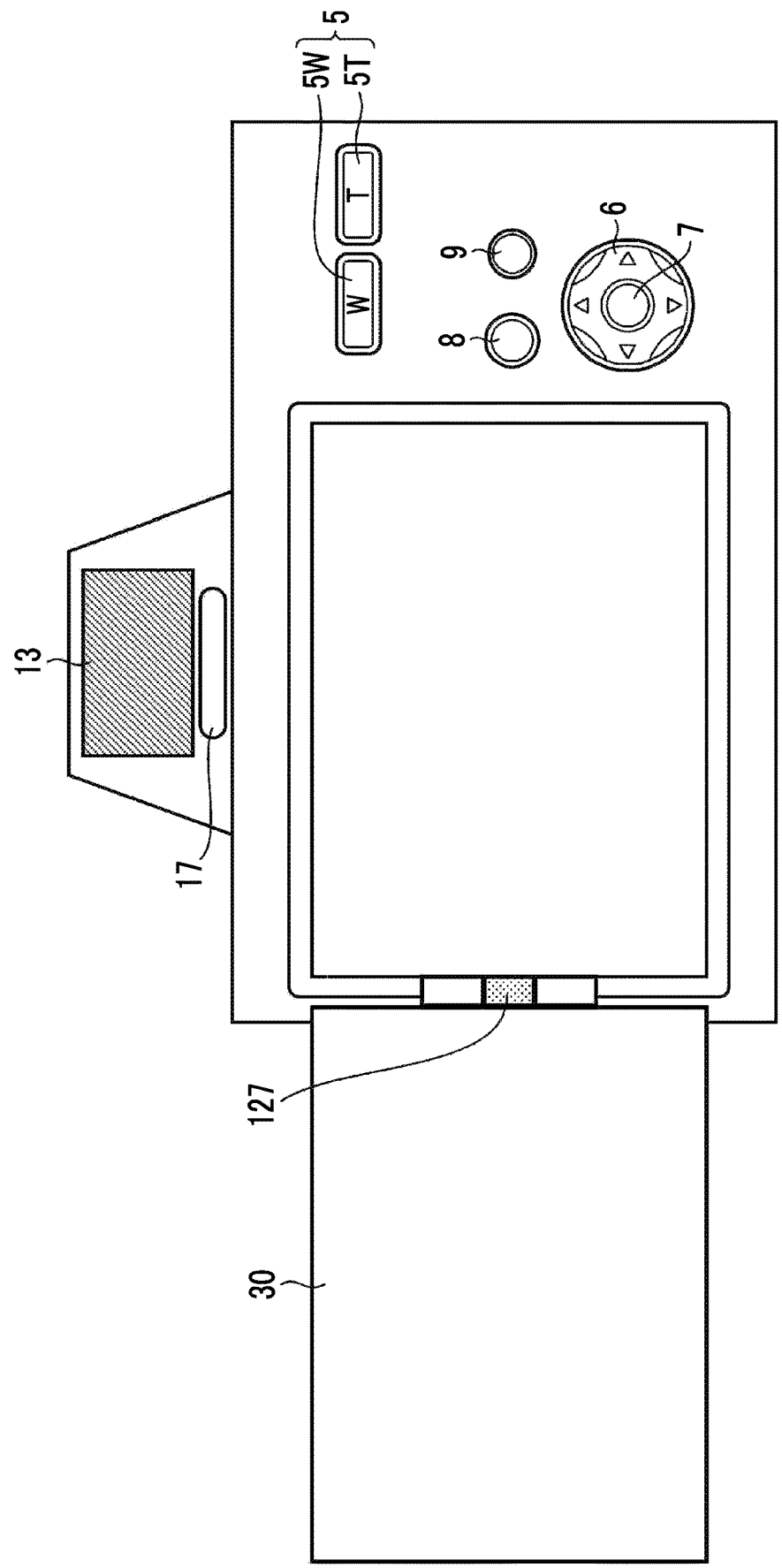

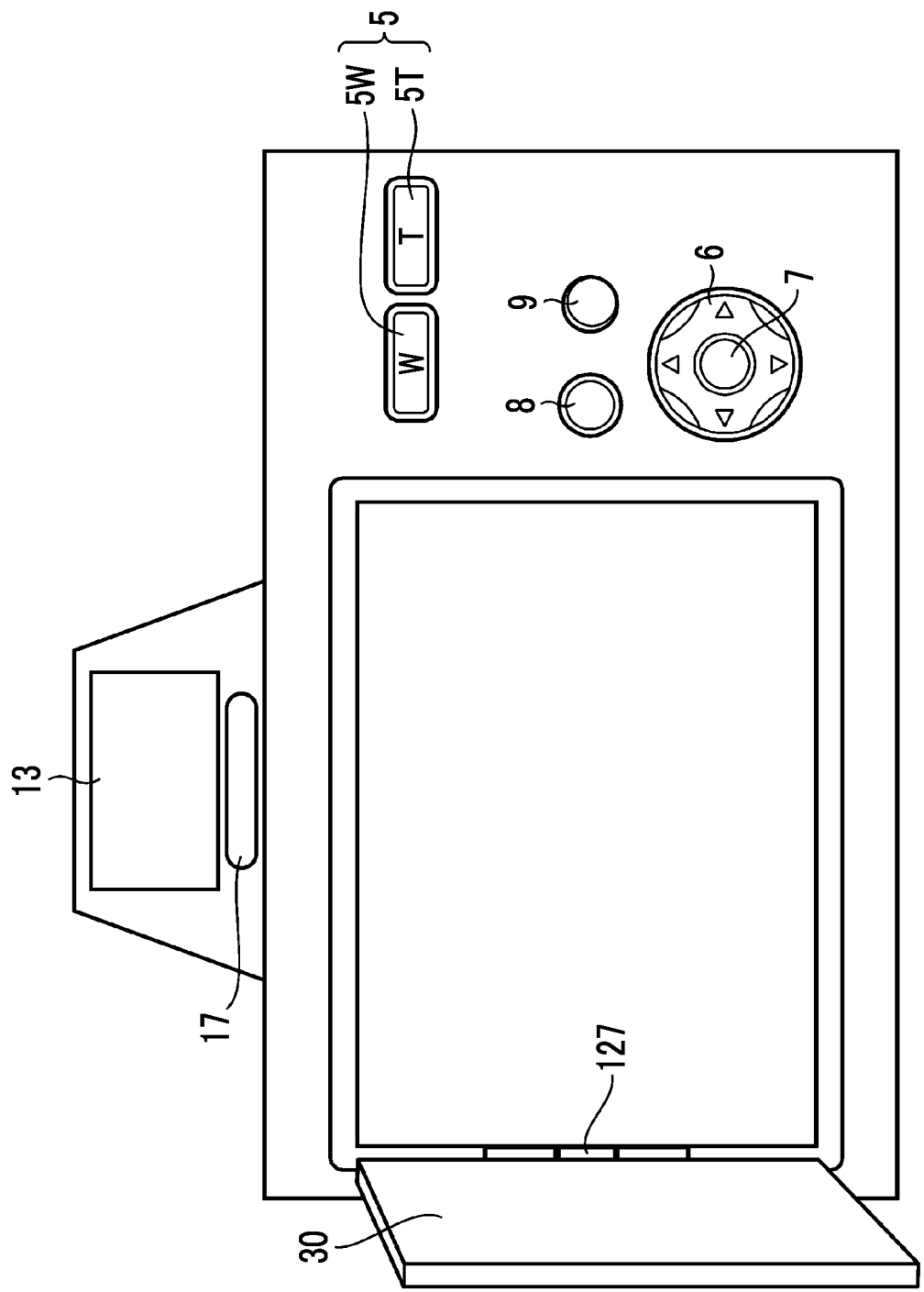

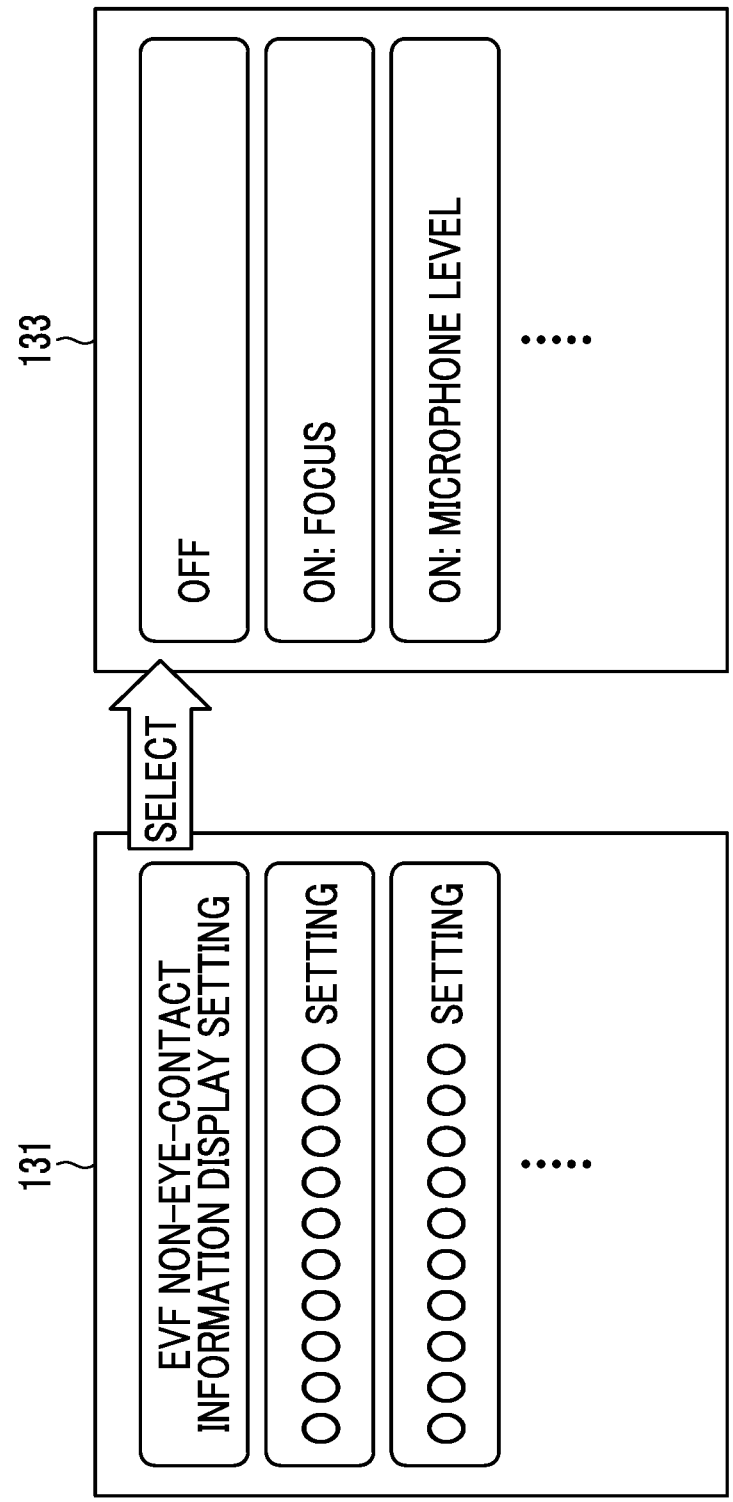

IMAGING APPARATUS, IMAGING METHOD, AND PROGRAM

CROSS-REFERENCE TO RELATED APPLICATIONS

The present application is a Continuation of PCT International Application No. PCT/JP2021/006659 filed on Feb. 22, 2021 claiming priority under 35 U.S.C § 119(a) to Japanese Patent Application No. 2020-033964 filed on Feb. 28, 2020. Each of the above applications is hereby expressly incorporated by reference, in its entirety, into the present application.

BACKGROUND OF THE INVENTION

1. Field of the Invention

The present invention relates to an imaging apparatus, an imaging method, and a program.

2. Description of the Related Art

In recent years, a digital camera (imaging apparatus) is capable of capturing a high-quality moving image.

JP2015-227902A discloses an imaging apparatus comprising: a main body provided with an imaging unit; a viewfinder that has a body part and a movable part, the viewfinder being capable of performing state transition in which the movable part operates in a first direction with respect to the body part to reach a usage state; and a control unit performing processing according to the state transition.

SUMMARY OF THE INVENTION

One embodiment according to the technology of the present disclosure provides an imaging apparatus, an imaging method, and a program that change a display form of a display unit in accordance with whether or not a display content of the display unit is visually recognizable.

An imaging apparatus according to one aspect of the present invention comprises: a first display unit; and a processor, in which the processor performs a determination process for determining whether or not a display content of the first display unit is visually recognizable by a user, and a display control for displaying a first display including at least one of a captured image or a character in a case where it is determined through the determination process that the display content is visually recognizable, and for causing the first display unit to display a second display that is a surface display in a case where it is not determined through the determination process that the display content is visually recognizable.

Preferably, the processor performs a surface display of color as the second display.

Preferably, the processor performs a blinking surface display as the second display.

Preferably, the second display is a display indicating a state related to imaging information.

Preferably, the imaging information is setting information of the imaging apparatus or information on the captured image.

Preferably, the imaging information is at least one of information on a focus control, information on a volume of a microphone, information on a memory, information on a temperature of the imaging apparatus, information on ISO sensitivity, information on white balance, or information on halation of an image.

Preferably, the imaging apparatus further comprises: a second display unit, in which the processor causes the second display unit to display the imaging information in a case where the first display unit performs the second display.

Preferably, the second display unit has a display surface of which a display angle is changeable with respect to a display surface of the first display unit, and the processor terminates the second display in a case where the display angle of the display surface of the second display unit exceeds a threshold value while the first display unit displays the second display.

Preferably, the imaging apparatus further comprises: an object detection sensor that detects presence or absence of an object existing around the first display unit, in which the processor makes determination according to a detection result of the object detection sensor in the determination process.

Preferably, the processor terminates the second display in a case where the object detection sensor detects an object after starting the second display on the first display unit.

Preferably, the object detection sensor is a proximity sensor that detects an object close to the first display unit.

Preferably, the processor makes determination based on whether or not an external apparatus is connected to the imaging apparatus in the determination process.

Preferably, the processor receives selection of information to be displayed in the second display, and causes the first display unit to perform the second display related to the selected information.

Preferably, the processor performs the second display in each of two regions into which a display surface of the first display unit is divided.

An imaging method according to another aspect of the present invention is an imaging method performed using an imaging apparatus including a first display unit and a processor, the method comprising: by the processor, a determination process step of determining whether or not a display content of the first display unit is visually recognizable by a user; and a display control step of displaying a first display including at least one of a captured image or a character in a case where it is determined through the determination process step that the display content is visually recognizable, and for causing the first display unit to display a second display that is a surface display in a case where it is not determined through the determination process step that the display content is visually recognizable.

A program according to still another aspect of the present invention is a program for causing an imaging apparatus including a first display unit and a processor to execute an imaging method comprising: by the processor, a determination process step of determining whether or not a display content of the first display unit is visually recognizable by a user; and a display control step of displaying a first display including at least one of a captured image or a character in a case where it is determined through the determination process step that the display content is visually recognizable, and for causing the first display unit to display a second display that is a surface display in a case where it is not determined through the determination process step that the display content is visually recognizable.

BRIEF DESCRIPTION OF THE DRAWINGS

FIG. 12 is a diagram illustrating another example in a case of stopping the second display.

FIG. 13 is a diagram illustrating still another example in a case of stopping the second display.

FIG. 14 is a diagram showing a setting screen of the second display.

DESCRIPTION OF THE PREFERRED EMBODIMENTS

Hereinafter, preferred embodiments of an imaging apparatus, an imaging method, and a program according to the present invention will be described with reference to accompanying drawings.

Figure 1:
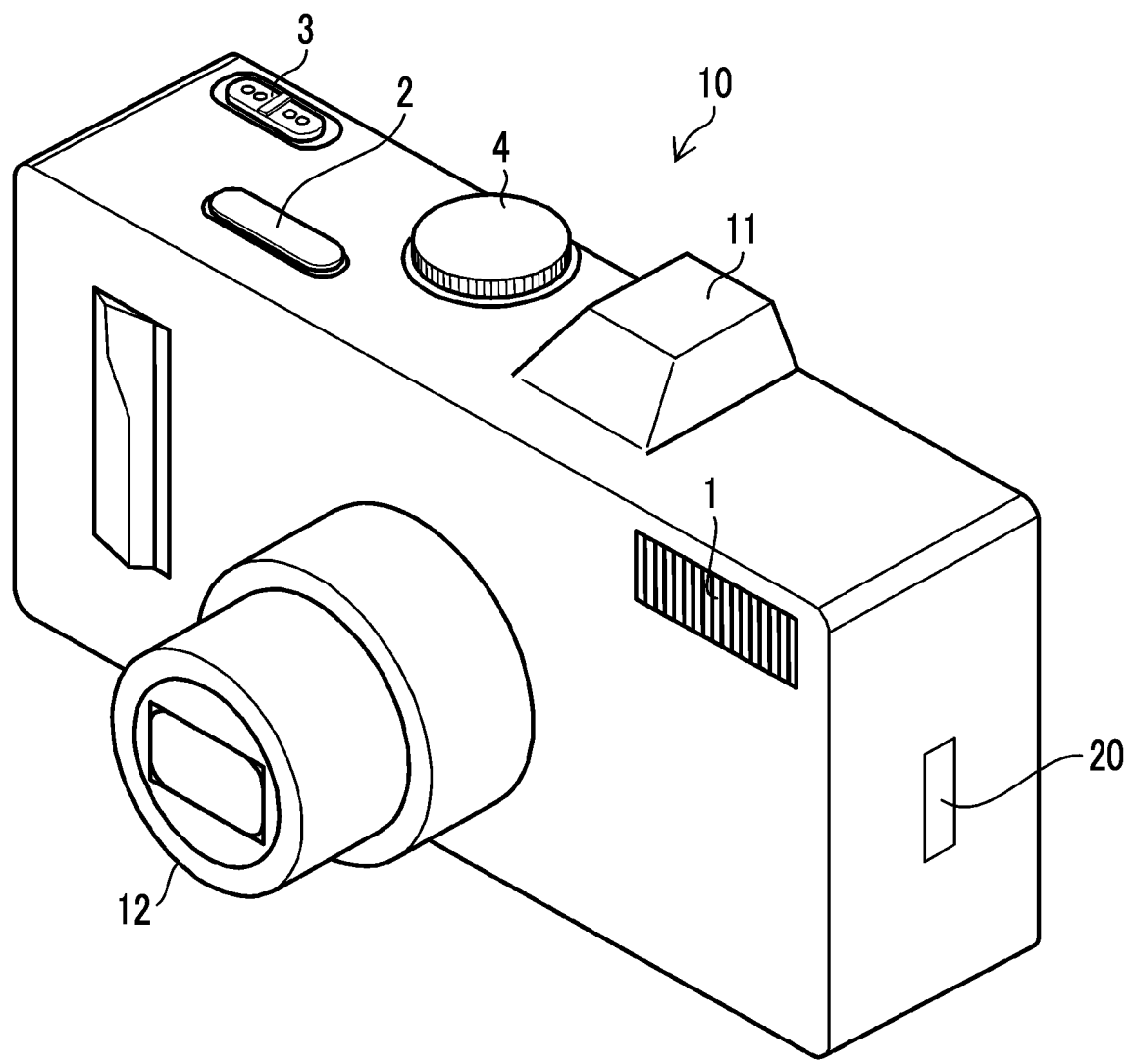
FIG. 1 is a perspective view showing an example of an imaging apparatus.
Figure 2:
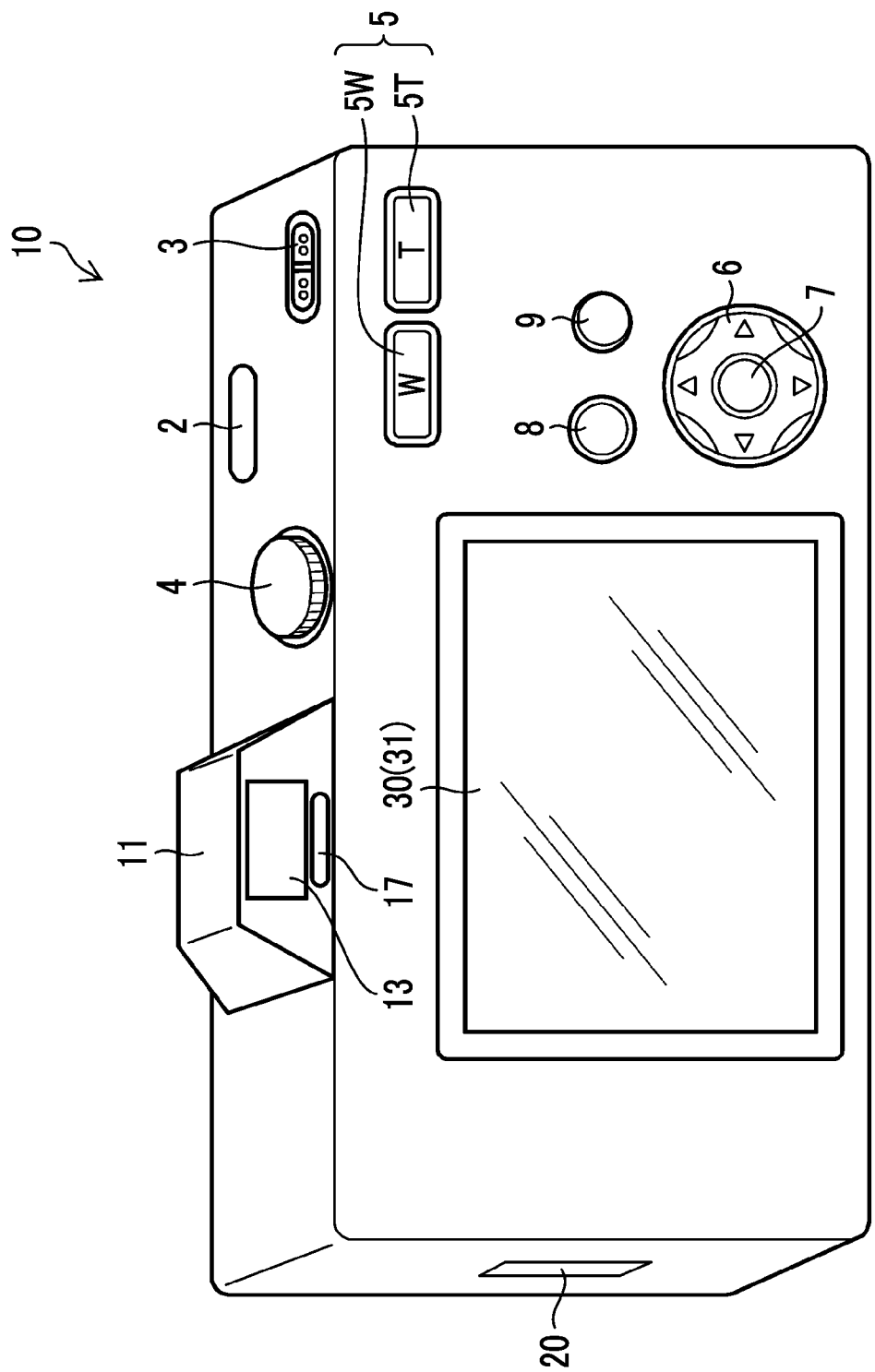
FIG. 2 is a rear view showing an example of the imaging apparatus.

FIGS. 1 and 2 are a perspective view and a rear view showing an imaging apparatus (digital camera) 10 according to an embodiment of the present invention. The imaging apparatus 10 receives light that has passed through a lens by an imaging element 16 (FIG. 3), converts the light into a digital signal, and records the digital signal in a recording medium as image data of a static image or a moving image.

As shown in FIG. 1, in the imaging apparatus 10, an imaging lens 12, a flash 1, and the like are arranged on a front surface thereof, a shutter button 2, a power/mode switch 3, a mode dial 4, and the like are arranged on an upper surface thereof, and an external apparatus connection terminal 20 is arranged on a side surface thereof. In addition, as shown in FIG. 2, on a rear surface of the imaging apparatus 10, a rear monitor 30 composed of liquid crystal (LC) or organic light emitting diode (OLED), a zoom button 5, a cross button 6, a MENU/OK button 7, a play button 8, a BACK button 9, a finder (electronic viewfinder: second display unit) 11, a finder monitor (first display unit) 13 composed of liquid crystal or OLED, an eye sensor 17, and the like are provided.

The imaging lens 12 is composed of, for example, a retractable zoom lens, and, in a case of a camera-integrated type or the like, the imaging lens 12 is extended from a camera body by setting an operation mode of the camera to an imaging mode by the power/mode switch 3. The imaging lens 12 may be a zoom lens or a fixed focal (so-called single focal) lens. The flash 1 irradiates a main subject with flash light, but is not necessarily required. Here, the imaging lens 12 may be interchangeable with respect to the imaging apparatus 10, or may be fixed (camera-integrated type).

The shutter button 2 is composed of a two-step stroke type switch consisting of so-called "half push" and "full push", and functions as an imaging preparation instruction unit and functions as a recording instruction unit of an image or moving image. In a case of a switch having a contact detection function, the "half push" is realized by contact of an operator's finger or the like with the switch, and it can also be performed with a one-step stroke switch.

In a case where a static image capturing mode is selected as the imaging mode and the shutter button 2 is "half-pushed", the imaging apparatus 10 performs an imaging preparation operation for performing auto focus (AF)/auto exposure (AE) control according to necessity or setting, and in a case where the shutter button 2 is "full-pushed", the imaging apparatus 10 captures and records a static image.

In addition, in a case where a moving image capturing mode is selected as the imaging mode and the shutter button 2 is pushed, the imaging apparatus 10 starts recording the moving image, and in a case where the shutter button 2 is pushed again, the imaging apparatus 10 stops the recording and enters a standby state.

The power/mode switch 3 has both a function as a power switch for turning on/off the power of the imaging apparatus 10 and a function as a mode switch for setting a mode of the imaging apparatus 10, and is slidably arranged between an "OFF position", a "play position" and an "imaging position". In the imaging apparatus 10, the power is turned on by sliding the power/mode switch 3 to the "play position" or the "imaging position", and the power is turned off by sliding the power/mode switch 3 to the "OFF position". Then, a "playback mode" is set by sliding the power/mode switch 3 to the "play position", and an "imaging mode" is set by sliding the power/mode switch 3 to the "imaging position".

The mode dial 4 functions as a mode switching unit that sets the imaging mode of the imaging apparatus 10, and the imaging mode of the imaging apparatus 10 is set to various modes depending on a setting position of the mode dial 4. For example, there are the "static image capturing mode" for capturing a static image, the "moving image capturing mode" for capturing a moving image, and the like. The configuration of the power/mode switch 3 and the mode dial 4 is not necessarily limited to this setting, and these user interfaces can be appropriately configured differently as needed.

The rear monitor 30 and the finder monitor 13 function as a part of a graphical user interface by displaying a live view image in the imaging mode, displaying the static image or the moving image in the playback mode, and displaying a menu screen. The finder monitor 13 can perform a surface display (second display), which will be described below. Further, a touch panel 31 (FIG. 3) is integrally installed on the rear monitor 30. The touch panel 31 may be embedded inside the rear monitor 30 (in-cell type) or may be attached to a viewing side of the rear monitor 30 (on-cell type). The touch panel may be of any type, such as a capacitance type, a resistance film type, or an optical type.

The zoom button 5 functions as zoom instruction means for instructing zooming, and consists of a telephoto button 5T for instructing zooming to a telephoto side and a wide button 5W for instructing zooming to a wide angle side. In the imaging apparatus 10, in the imaging mode, a focal length of the imaging lens 12 is changed by operating the telephoto button 5T and the wide button 5W. In the playback mode, the telephoto button 5T and the wide button 5W are operated to enlarge or reduce the image being played. Here, the zoom button 5 is provided on the rear surface of the imaging apparatus 10, the present invention is not limited to this, and the zoom button 5 may be provided on the front surface of the imaging apparatus 10 or may be provided on the imaging lens 12. The zoom button 5 is not required in a case of a single focal lens.

The cross button 6 is an operation unit that inputs instructions in four directions, for example, up, down, left, and right, and functions as a button (cursor moving operation means) for selecting an item from a menu screen or instructing selection or movement of various setting items from each menu. For example, left/right keys function as a frame feed (forward/reverse direction) button in the playback mode.

The MENU/OK button 7 is an operation button having both a function as a menu button for issuing a command for displaying a menu on the screen of the rear monitor 30 and a function as an OK button for issuing a command for determining and executing a selected content.

The play button 8 is a button for switching to the playback mode in which the static image or the moving image recorded by imaging is displayed on the rear monitor 30 or the finder monitor 13.

The BACK button 9 functions as a button for instructing cancellation of the input operation or returning to the immediately previous operation state.

Although members specific to the above-described buttons/switches are provided, the functions of those buttons/switches can be realized by operating the touch panel 31. These user interfaces can be appropriately configured differently as needed.

Figure 3:
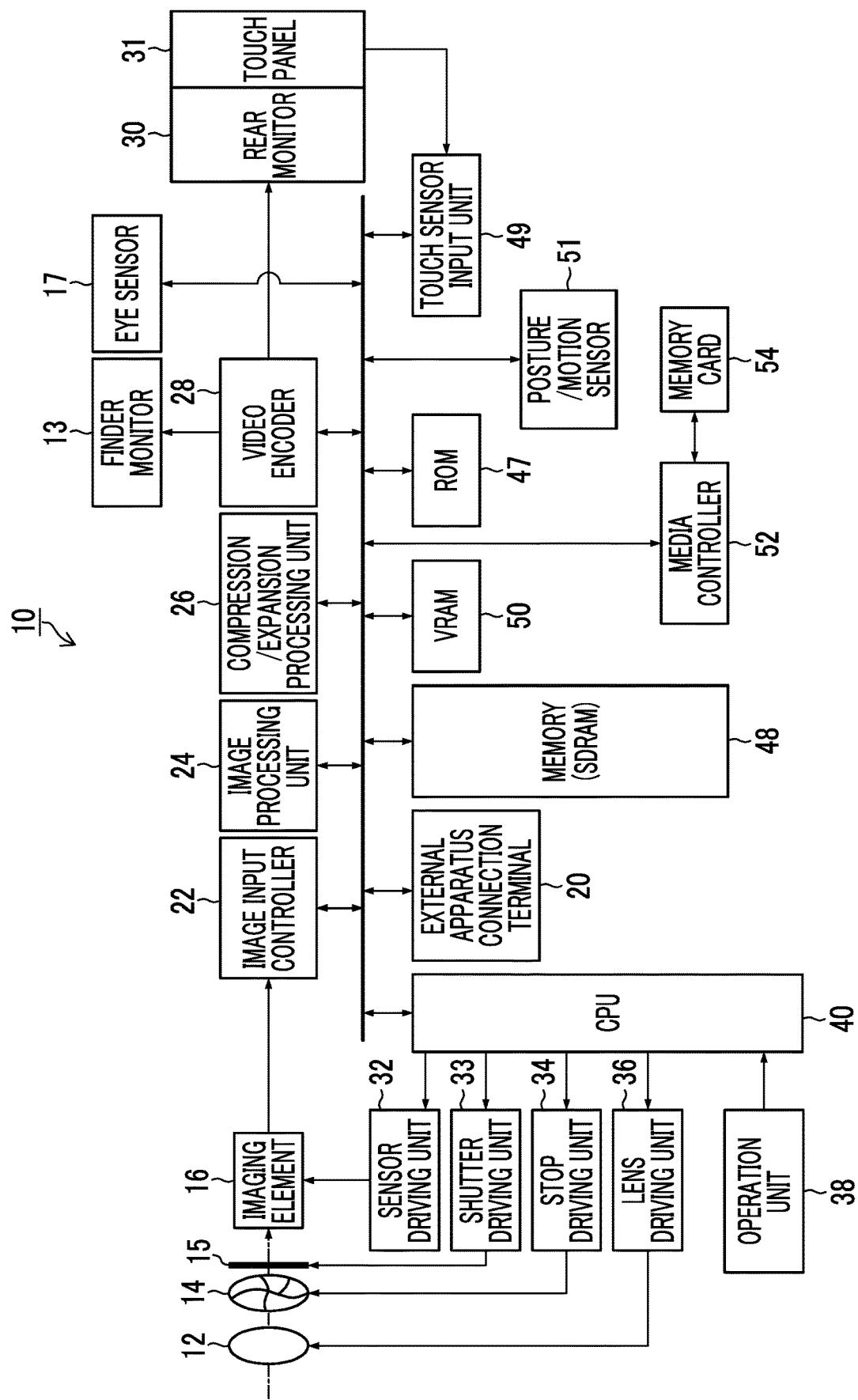
FIG. 3 is a block diagram showing an embodiment of an internal configuration of the imaging apparatus.

FIG. 3 is a block diagram showing an embodiment of an internal configuration of the imaging apparatus 10. The imaging apparatus 10 records a captured image in a memory card 54, and the operation of the entire apparatus is collectively controlled by a central processing unit (CPU) (processor) 40.

The imaging apparatus 10 is provided with an operation unit 38, such as the shutter button 2, the power/mode switch 3, the mode dial 4, the telephoto button 5T, the wide button 5W, the cross button 6, the MENU/OK button 7, the play button 8, and the BACK button 9. A signal from the operation unit 38 is input to the CPU 40, and the CPU 40 controls each circuit of the imaging apparatus 10 based on the input signals, to perform, for example, driving control of the imaging element 16 by a sensor driving unit 32, driving control of a mechanical shutter 15 by a shutter driving unit 33, driving control of a stop 14 by a stop driving unit 34, and driving control of the imaging lens 12 by a lens driving unit 36, and, in addition, imaging operation control, image processing control, recording/playing control of image data, and display control of the finder monitor 13 and the rear monitor 30.

An external apparatus connected to the imaging apparatus 10 is connected to the external apparatus connection terminal 20. The external apparatus connected to the imaging apparatus 10 is, for example, an external microphone, an external monitor, or an external battery. Specific examples of the external apparatus connection terminal 20 include a microphone terminal and an HDMI (registered trademark) terminal. The external apparatus connection terminal 20 also includes a terminal to be wirelessly connected. For example, the external apparatus connection terminal 20 includes terminals such as a wireless local area network (LAN), Bluetooth (registered trademark), and ultra wide band (UWB) for wireless communication.

In a case where the power of the imaging apparatus 10 is turned on by the power/mode switch 3, the power is supplied to each block from a power supply unit (not shown), and driving of the imaging apparatus 10 is started.

The light flux that has passed through the imaging lens 12, the stop 14, the mechanical shutter 15, and the like is imaged on the imaging element 16 which is a complementary metal-oxide semiconductor (CMOS) type image sensor. The imaging element 16 is not limited to the CMOS type, and may be an XY address type or charge coupled device (CCD) type image sensor. The image sensor may be a color image sensor or a monochromatic (for example, black and white) image sensor.

In the imaging element 16, a large number of light-receiving elements (photodiode) are two-dimensionally arranged, and a subject image formed on a light-receiving surface of each photodiode is output after a signal charge in an amount corresponding to an amount of incidence ray of each light-receiving element is converted into a voltage by an amplifier and is converted into a digital signal via an analog/digital (A/D) converter in the imaging element 16.

An image signal (image data) read from the imaging element 16 in a case of capturing the moving image or the static image is temporarily stored in a memory (synchronous dynamic random access memory (SDRAM)) 48 via an image input controller 22. The SDRAM is an example, and any memory such as a resistive random access memory (ReRAM), a phase-change memory (PCM), and a magnetoresistive random access memory (MRAM) can be selected as needed.

The CPU 40 collectively controls each unit of the imaging apparatus 10 based on the operation by the operation unit 38, and always performs the AF operation and the AE operation during the capturing (displaying) of the live view image and the capturing (recording) of the moving image.

The CPU 40 moves the zoom lens forward and backward in an optical axis direction via the lens driving unit 36 in response to a zoom command from the zoom button 5, to change the focal length.

Figure 4:
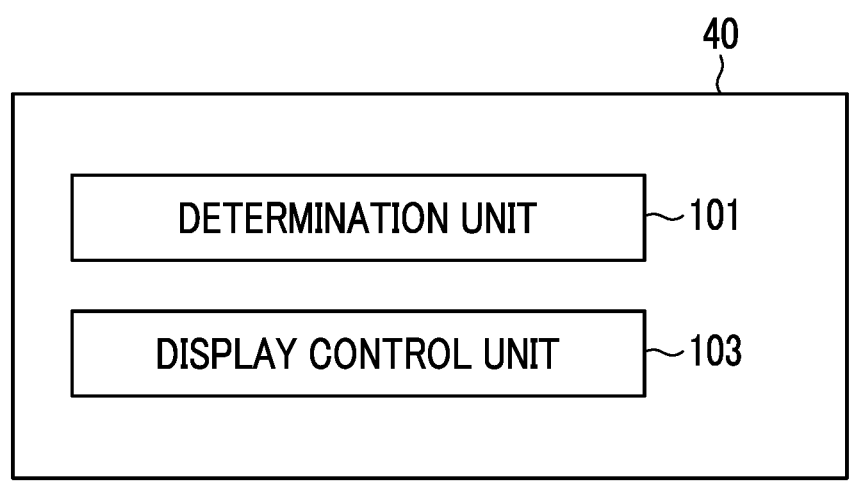
FIG. 4 is a block diagram showing a main functional configuration realized by a CPU.

FIG. 4 is a block diagram showing a main functional configuration realized by the CPU 40. The CPU 40 comprises a determination unit 101 and a display control unit 103.

The determination unit 101 determines whether or not an imaging person (user) can visually recognize a display content of the first display on the finder monitor 13. In a case where the eye sensor 17 detects an object, the determination unit 101 determines that the imaging person can visually recognize the display content of the first display, and in a case where the eye sensor 17 does not detect the object, the determination unit 101 does not determine that the imaging person can visually recognize the display content of the first display. Here, the first display is a display including at least one of a captured image or a character, and is a display of a normal display form displayed on the so-called finder monitor 13. The first display includes, for example, a display of a live view, and a menu screen for setting imaging conditions. The first display is a display assuming that an imaging person's eye is in contact with the finder 11, and in a case where the imaging person's eye is not in contact with the finder 11, the individual display contents visible to the imaging person are small and it is difficult to visually recognize the contents of the first display.

The display control unit 103 performs the first display or the second display on the finder monitor 13 according to the result of the determination process in the determination unit 101. Specifically, the display control unit 103 performs the first display on the finder monitor 13 in a case where the determination unit 101 determines that the display content can be visually recognized. On the other hand, the display control unit 103 performs the second display on the finder monitor 13 in a case where the determination unit 101 does not determine that the display content can be visually recognized. The second display is a surface display on the display screen of the finder monitor 13, which will be described below. Since the second display is a surface display on the finder monitor 13, the content of the second display can be visually recognized even in a case where the imaging person's eye is not in contact with the finder 11.

Returning to FIG. 3, the ROM 47 is a flash memory, a read only memory (ROM), an electrically erasable programmable read-only memory (EEPROM), or a magnetoresistive random access memory (MRAM) in which various parameters and tables used for a camera control program, defect information of the imaging element 16, image processing, or the like are stored.

An image processing unit 24 reads unprocessed image data (RAW data) that is acquired via the image input controller 22 in a case of capturing a moving image or a static image and is temporarily stored in the memory 48. The image processing unit 24 performs, on the read RAW data, offset processing, pixel interpolation processing (interpolation processing for a phase-difference detection pixel, damaged pixel, and the like), white balance correction, gain control processing including sensitivity correction, gamma-correction processing, demosaicing processing, brightness and color difference signal generation processing, contour enhancement processing, color correction processing, and the like.

The image data processed by the image processing unit 24, that is, the image data processed as a live view image is input to a video random access memory (VRAM) 50.

The VRAM 50 includes an A region and a B region, each of which records image data representing an image for one frame. In the VRAM 50, the image data representing the image for one frame is alternately rewritten in the A region and the B region. The written image data is read from a region, other than the region where the image data is rewritten, of the A region and the B region of the VRAM 50.

The eye sensor 17 is a sensor that detects whether or not the imaging person is looking into the finder monitor 13. The eye sensor 17 is composed of an object detection sensor that detects the presence or absence of an object existing around the finder monitor 13, and is a proximity sensor that detects an object in proximity.

The image data read from the VRAM 50 is encoded by a video encoder 28 and output to the finder monitor 13 and the rear monitor 30 provided on the rear surface of the camera. As a result, the live view image showing the subject image is displayed on the finder monitor 13 and the rear monitor 30. The display of the live view image on the finder monitor 13 or the rear monitor 30 is controlled by the detection of the eye sensor 17. In a case where the eye sensor 17 detects an object close to the finder monitor 13, the live view image is displayed on the finder monitor 13, and in a case where the eye sensor 17 detects that there is no object close to the finder monitor 13, the live view image is displayed on the rear monitor 30.

The touch panel 31 is provided integrally with the rear monitor 30. The touch panel 31 detects contact of the imaging person's finger as an operation by the imaging person.

A touch sensor input unit 49 analyzes a touch position of the imaging person's finger on the touch panel 31 and the movement of the finger from a signal from the touch panel 31, and outputs the analyzed result.

The image data processed by the image processing unit 24, that is, the image data processed as a static image or moving image for recording (brightness data (Y) and color difference data (Cb), (Cr)) is stored again in the memory 48.

A compression/expansion processing unit 26 performs compression processing on the brightness data (Y) and the color difference data (Cb), (Cr) processed by the image processing unit 24 and stored in the memory 48 in a case of recording a static image or moving image. A static image is compressed, for example, in a joint photographic coding experts group (JPEG) format, and a moving image is compressed, for example, in an H.264 format. The compressed image data compressed by the compression/expansion processing unit 26 is recorded in the memory card 54 via a media controller 52.

The compression/expansion processing unit 26 performs expansion processing on the compressed image data obtained from the memory card 54 via the media controller 52 in the playback mode. The media controller 52 records and reads the compressed image data to and from the memory card 54. Although the image input controller 22, the image processing unit 24, the compression/expansion processing unit 26, the video encoder 28, the media controller 52, and the like described above are described as independent processing units (circuits), they can also be executed by software processing by a program built in the memory 48 (or the ROM 47) by the CPU 40.

A posture/motion sensor 51 is a sensor that detects the posture and motion of the imaging apparatus 10. The posture/motion sensor 51 is composed of, for example, a gyro sensor.

Next, an example in which the imaging apparatus 10 is used will be described.

The imaging apparatus 10 is equipped with the finder 11, and the imaging person can check exposure, imaging setting, and the like displayed on the finder monitor 13 by the contact of the imaging person's eye with the finder 11. However, in a case where the imaging apparatus 10 is used for capturing a moving image, the imaging apparatus 10 is used by being fixed to an apparatus called a rig for fixing an external monitor, an external microphone, and an external battery, or used by being fixed to a stabilizer for suppressing camera shake. The case where the imaging apparatus 10 is fixed to the rig and the case where the imaging apparatus 10 is fixed to the stabilizer will be described below.

Figure 5:
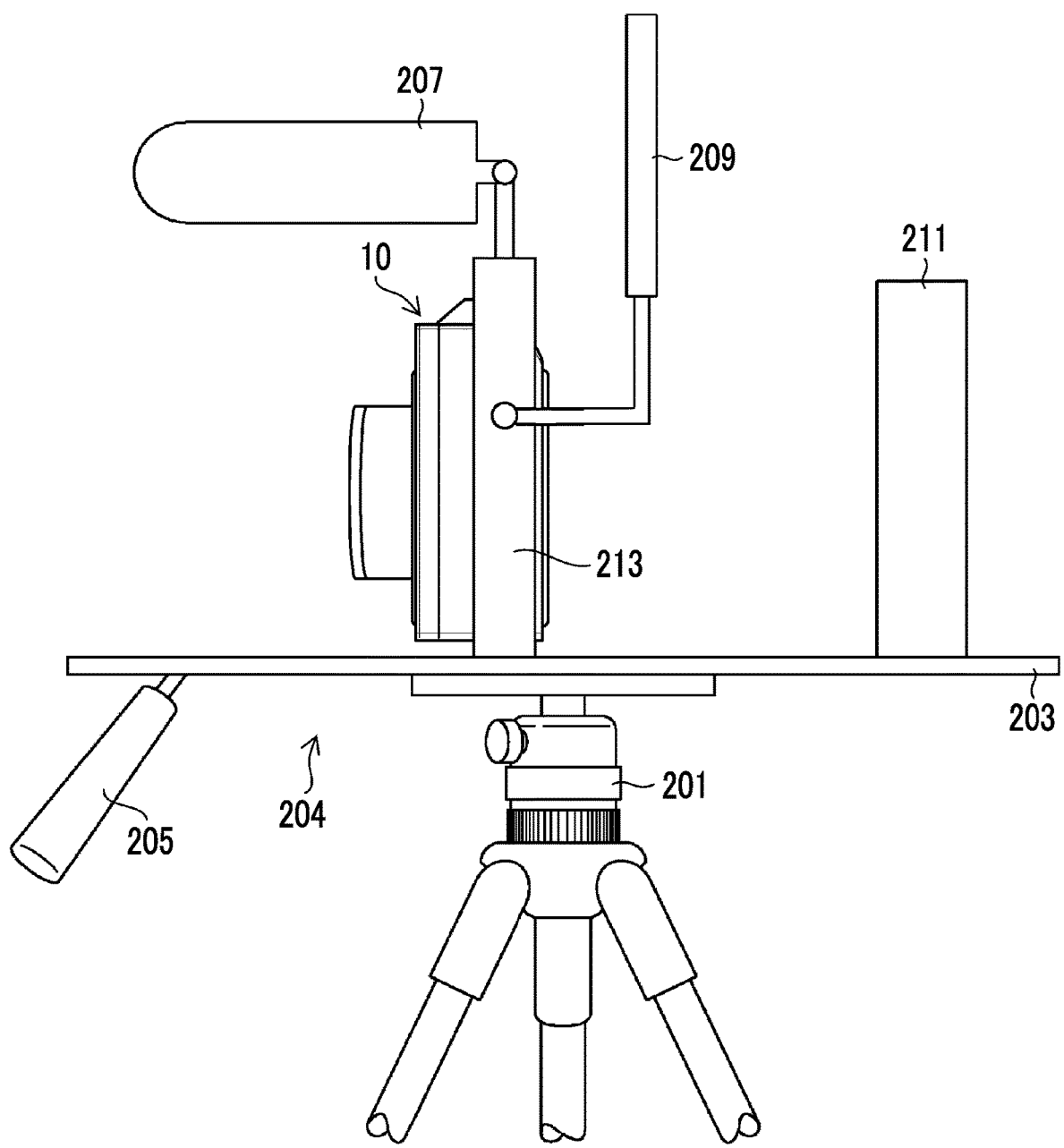
FIG. 5 is a diagram showing a state in which the imaging apparatus is fixed to a tripod and a rig is assembled.

FIG. 5 is a diagram showing a state in which the imaging apparatus 10 is fixed to a tripod 201 and a rig 204 is assembled. As shown in FIG. 5, the imaging apparatus 10 is fixed to the tripod 201 and fixed to the assembled rig 204. A cage 213 is attached to the imaging apparatus 10, and an external apparatus is attached to the cage 213. Specifically, a gun microphone 207 as an external microphone and an external monitor 209 are attached to the cage 213. The gun microphone 207 and the external monitor 209 are connected to the external apparatus connection terminal 20. A lot 203 is attached to the cage 213, and a handle 205 is attached to the lot 203. An external battery 211 is attached to the lot 203 behind the imaging apparatus 10. Here, the rig 204 is configured by the cage 213, the lot 203, and the handle 205, and by assembling the rig 204, imaging in which camera shake or the like is suppressed can be performed.

Figure 6:
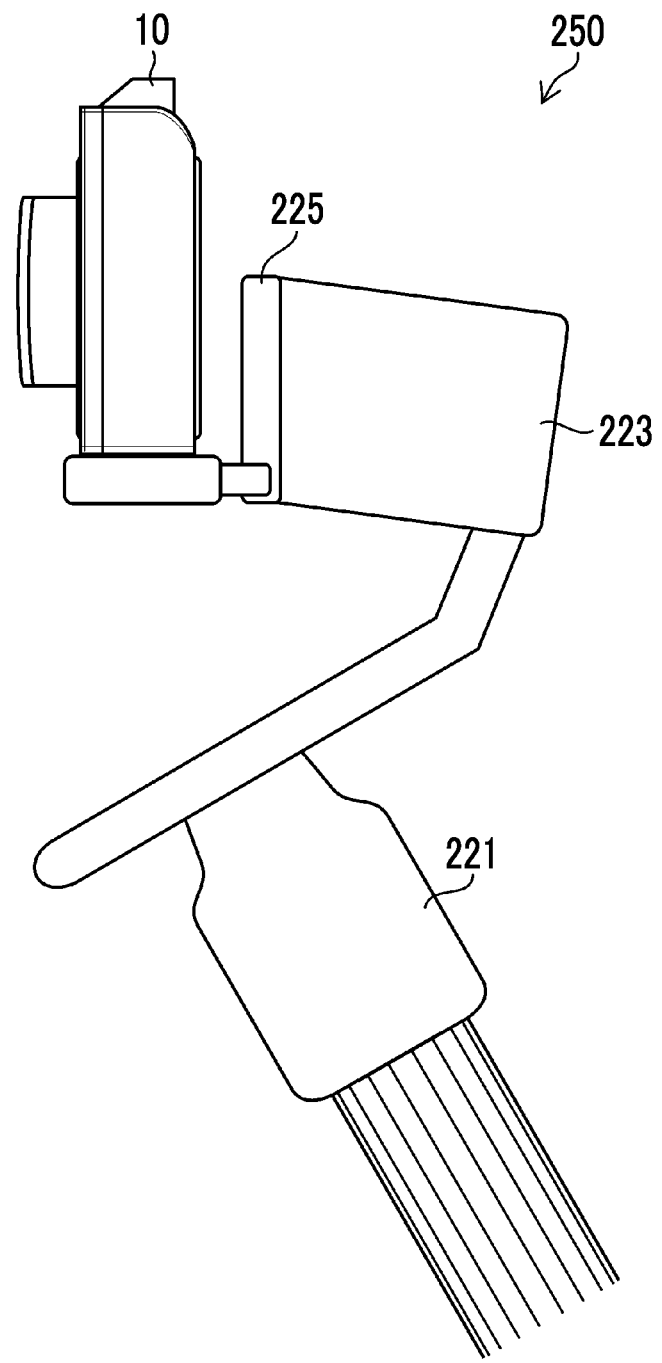
FIG. 6 is a diagram showing the imaging apparatus attached to a stabilizer.

FIG. 6 is a diagram showing the imaging apparatus 10 attached to a stabilizer 250. The stabilizer 250 is composed of a grip 221, a first support member 223, and a second support member 225. The imaging apparatus 10 is attached by the second support member 225. The attached imaging apparatus 10 is movable in a roll direction, in a tilt direction, and in a pan direction by a mechanism composed of the first support member 223 and the second support member 225.

By holding the grip 221 by hand and capturing a moving image by the imaging apparatus 10, the imaging person can capture the moving image by suppressing camera shake by the mechanism composed of the first support member 223 and the second support member 225.

As described above, in a case where the imaging apparatus 10 is attached to the rig 204, for example, the external battery 211 is an obstacle, and it is considered that the imaging person's eye cannot be brought into contact with the finder 11. In addition, in a case where the imaging apparatus 10 is attached to the stabilizer 250, for example, the support member of the stabilizer 250 is an obstacle, and it is considered that the imaging person's eye cannot be brought into contact with the finder 11. Normally, in a case where the imaging person's eye is not in contact with the finder 11, the eye sensor 17 does not detect an object in proximity, so that the display (first display) of the finder monitor 13 is stopped and turned off.

In the embodiment of the present invention, even in a case where the imaging person's eye cannot be brought into contact with the finder 11 of the imaging apparatus 10, there is proposed a method for transmitting information to the imaging person by effectively using the finder monitor 13 of the finder 11.

First Embodiment

Next, a first embodiment of the present invention will be described.

Figure 7:
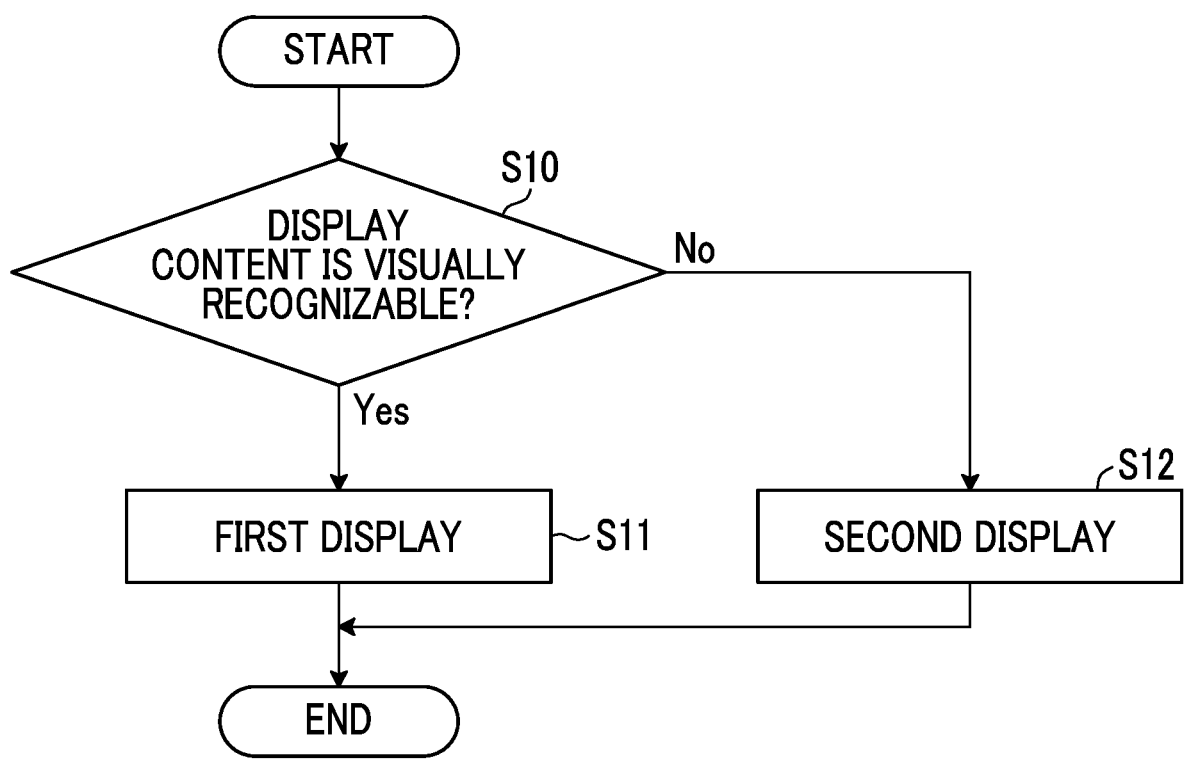
FIG. 7 is a flowchart showing an imaging method performed using the imaging apparatus.

FIG. 7 is a flowchart showing an imaging method performed using the imaging apparatus 10 in the present embodiment.

First, a determination process step is performed by the determination unit 101 (Step S10). The determination unit 101 determines whether or not the imaging person can visually recognize the display content of the first display displayed on the finder monitor 13. Specifically, in a case where the eye sensor 17 detects an object, the determination unit 101 determines that the imaging person can visually recognize the display content of the first display displayed on the finder 11 by assuming that the imaging person's eye is in contact with the finder 11. On the other hand, in a case where the eye sensor 17 does not detect an object, the determination unit 101 does not determine that the imaging person can visually recognize the display content of the first display displayed on the finder 11 (determines that the display content cannot be visually recognized).

Next, a display control step is performed by the display control unit 103 (Steps S11 and S12). In a case where the determination unit 101 determines that the display content can be visually recognized, the display control unit 103 performs the first display on the finder monitor 13 (Step S11). On the other hand, in a case where the determination unit 101 does not determine that the display content can be visually recognized, the display control unit 103 performs the second display on the finder monitor 13 (Step S12). Specific examples of the first display and the second display will be described below.

Figure 8:
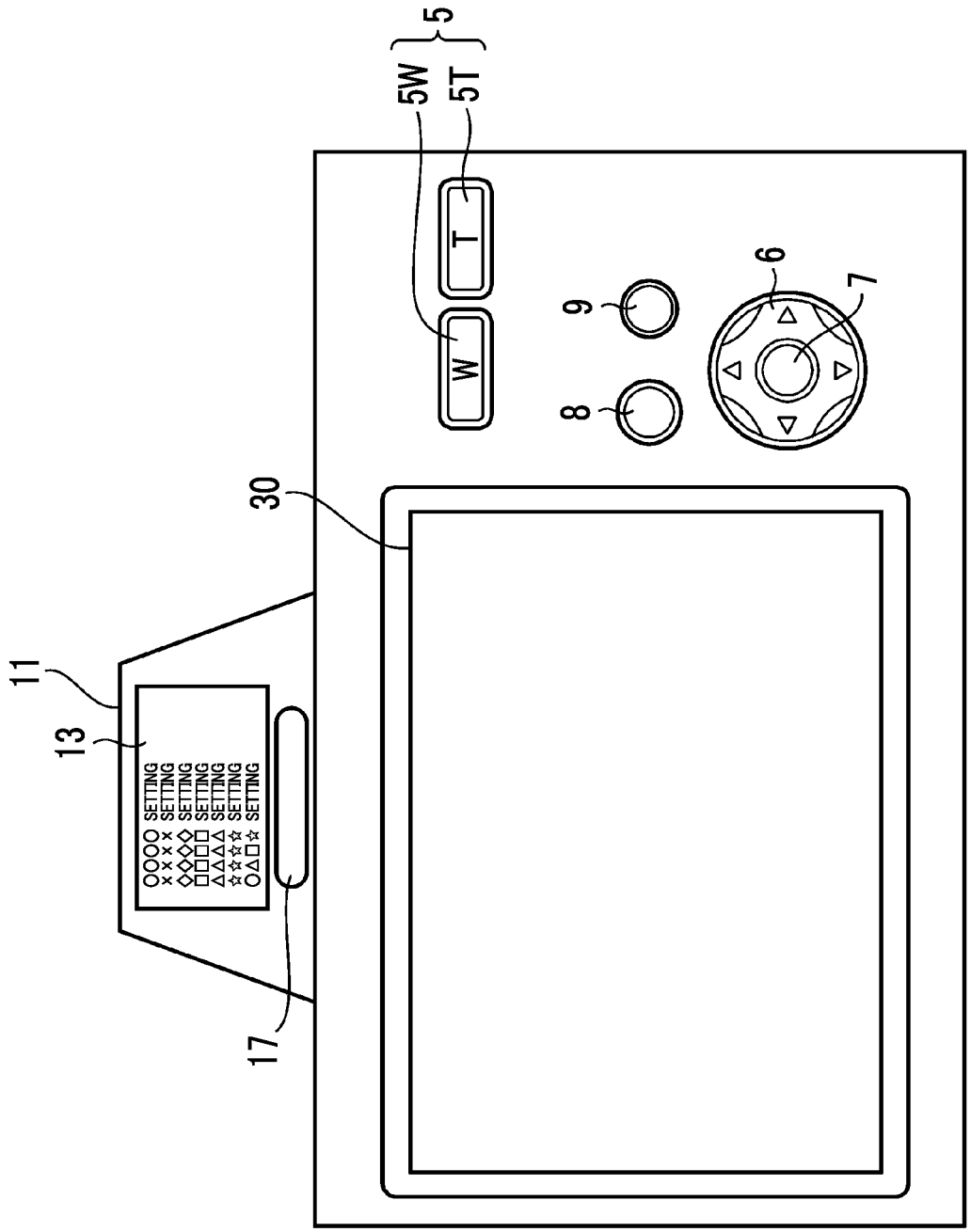
FIG. 8 is a diagram showing an example of a first display displayed on a finder monitor.

FIG. 8 is a diagram showing an example of the first display displayed on the finder monitor 13.

In the case shown in FIG. 8, a menu is displayed on the finder monitor 13. In a case where the imaging person's eye is not in contact with the finder 11, the imaging person cannot read character information of the menu display displayed on the finder monitor 13 because it is small. In the case shown in FIG. 8, an example of the menu display is shown, but it is difficult for the imaging person to visually recognize the menu display in a case where the imaging person's eye is not in contact with the finder 11 as in the other first display. For example, even in a case where a live view image is displayed on the finder monitor 13, it is difficult for the imaging person to visually recognize the displayed live view image because it is small in a case where the imaging person's eye is not in contact with the finder 11. On the other hand, since the second display is a surface display of the finder monitor 13, it is a display that can be visually recognized even in a case where the imaging person's eye is not in contact with the finder 11.

Figure 9:
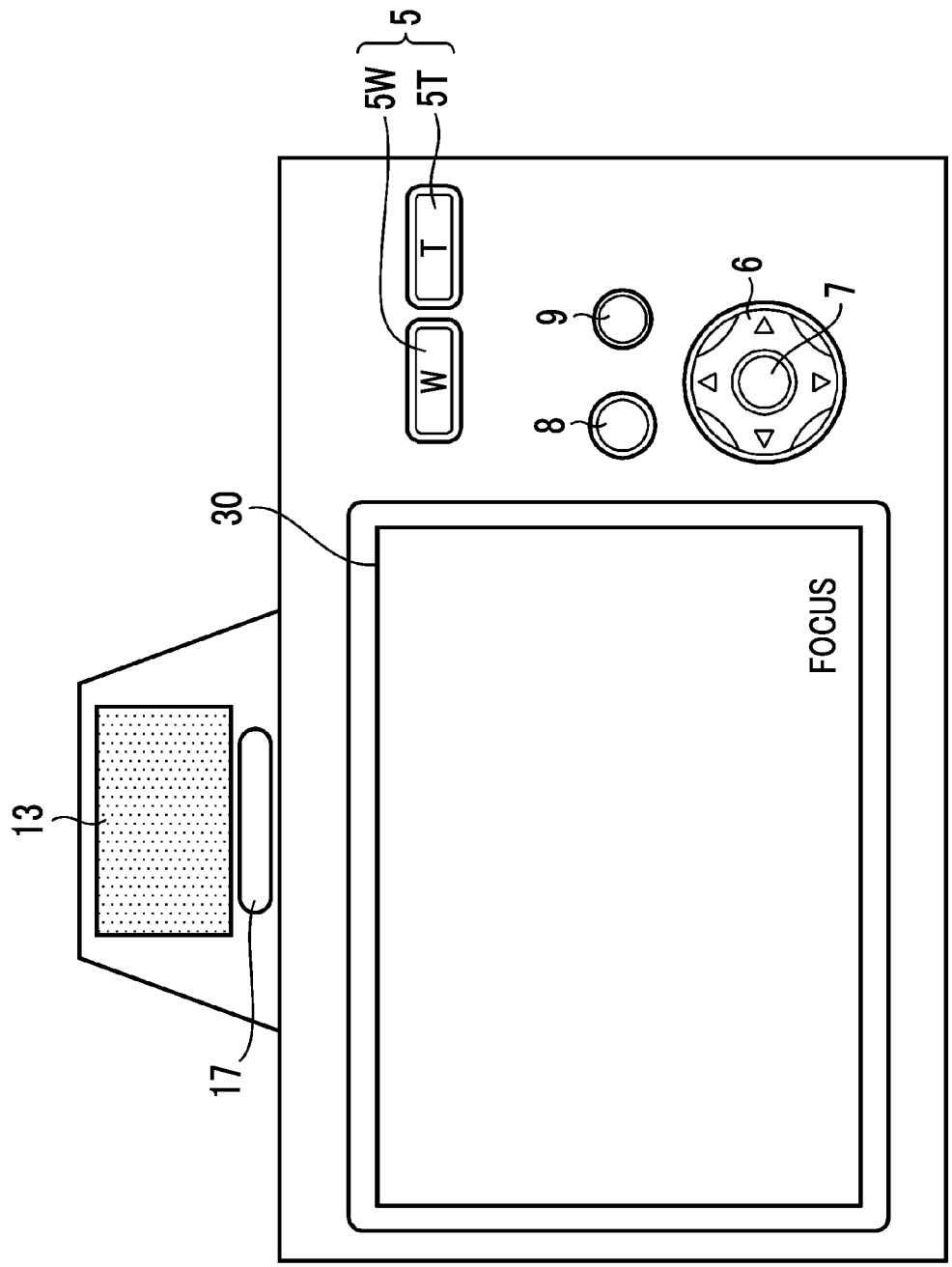
FIG. 9 is a diagram showing an example of a second display displayed on a finder monitor.

FIG. 9 is a diagram showing an example of the second display displayed on the finder monitor 13. In the case shown in FIG. 9, a surface display is performed on the finder monitor 13. That is, in the case shown in FIG. 9, one surface of the finder monitor 13 is displayed in green to perform a surface display. In the case shown in FIG. 9, a content of information reported by the second display of the finder monitor 13 is reported on the rear monitor 30 as character information. Specifically, since information on a focus control is reported by the second display, the character "focus" is displayed on the rear monitor 30.

For example, in a case where the information on the focus is reported by the second display, a green surface display is performed in a case where a focus area is in focus, and a red surface display is performed in a case where the focus area is out of focus, so that information on the focusing of the focus area can be reported. In the above example, it is described that the information on the focusing of the focus area is reported by the green surface display and the red surface display, but the information to be reported is not limited thereto. By the surface display of two different colors of the finder monitor 13, information indicating a state related to the imaging information can be reported, and the imaging information is setting information of the imaging apparatus 10 or information of the captured image. For example, by the display of the finder monitor 13, information indicating that moving image recording is stopped and recording is in progress, information indicating that an HDMI terminal (external apparatus connection terminal 20) is connected and disconnected, information indicating whether or not a flash is emitted in a case of capturing a static image, information indicating that auxiliary light is turned on and off, and information indicating that remote connection is connected and disconnected can be reported by changing the surface display of the finder monitor 13 and the color of the surface display. In addition, the second display is not limited to the surface display on the entire surface of the finder monitor 13. For example, the second display includes displaying the second display in a rectangular region located at the center of the finder monitor 13 and corresponding to an area of 80% of the total area of the finder monitor 13.

As described above, in the present embodiment, in a case where the determination unit 101 does not determine that the imaging person can visually recognize the first display displayed on the finder monitor 13, information is reported to the finder monitor 13 by the second display that can be visually recognized by the imaging person. As a result, even in a case where the imaging person cannot visually recognize the content of the first display (captured image or character) displayed on the finder monitor 13, information can be reported to the imaging person by efficiently using the finder monitor 13.

Second Embodiment

Next, a second embodiment of the present invention will be described.

Figure 10:
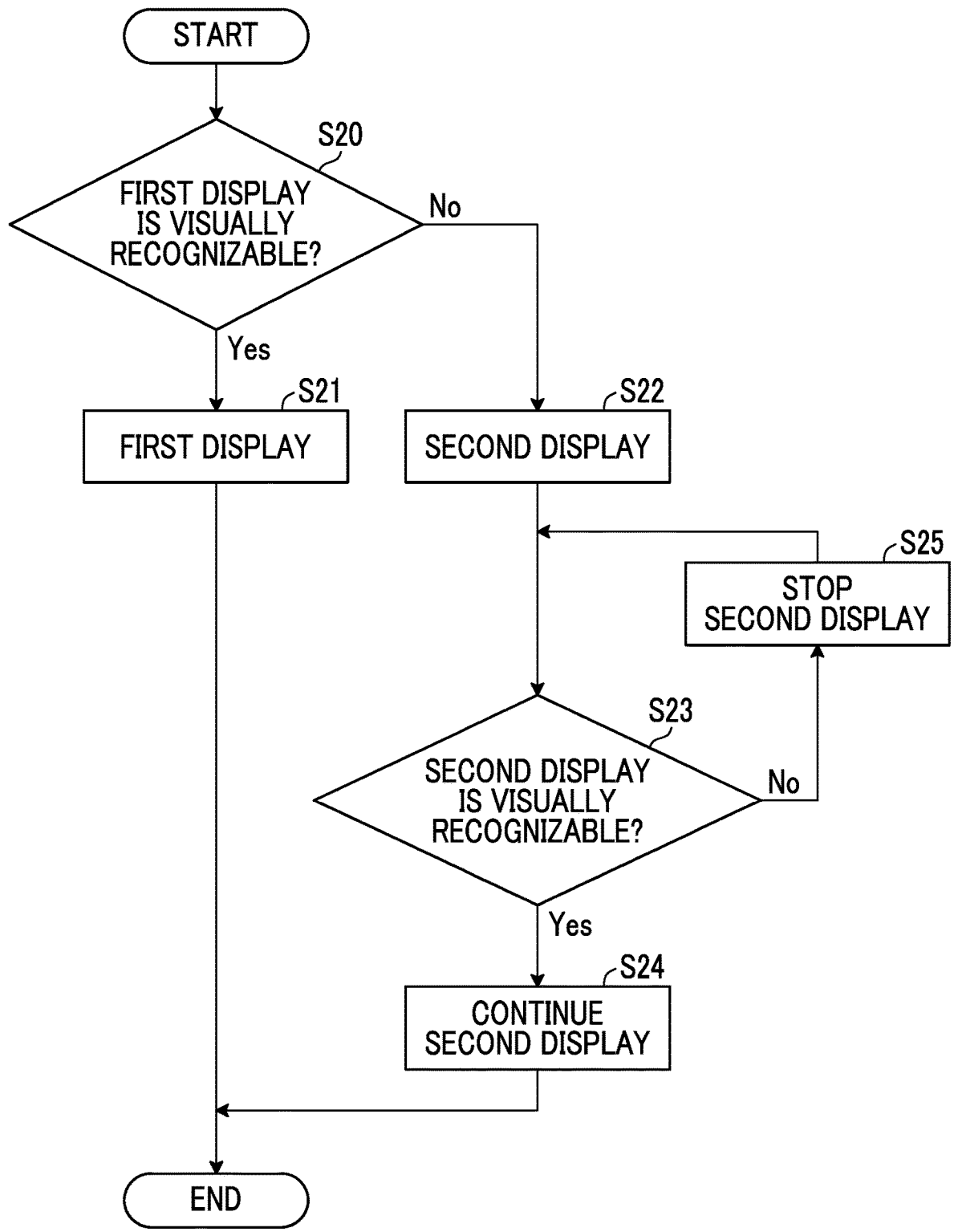
FIG. 10 is a flowchart showing an imaging method using the imaging apparatus.

FIG. 10 is a flowchart showing an imaging method using the imaging apparatus 10 in the present embodiment.

First, a determination process is performed by the determination unit 101 (Step S20). In a case where the eye sensor 17 detects an object, the determination unit 101 determines that the imaging person can visually recognize the display content of the first display, and in a case where the eye sensor 17 does not detect the object, the determination unit 101 does not determine that the imaging person can visually recognize the display content of the first display.

Next, a display control step is performed by the display control unit 103 (Steps S21 and S22). In a case where the determination unit 101 determines that the display content can be visually recognized, the display control unit 103 performs the first display on the finder monitor 13 (Step S21). On the other hand, in a case where the determination unit 101 does not determine that the display content can be visually recognized, the display control unit 103 performs the second display on the finder monitor 13 (Step S22).

In a case where the second display is displayed on the finder monitor 13, the determination unit 101 determines whether or not the imaging person can visually recognize the second display (Step S23). For example, in a case where the eye sensor 17 detects an object after the second display is started once, the determination unit 101 determines that the imaging person cannot visually recognize the second display. This is because it is assumed that in a case where the eye sensor 17 detects an object, the object exists on the rear surface of the imaging apparatus 10 and the imaging person cannot visually recognize the finder 11. Then, in a case where the determination unit 101 does not determine that the imaging person can visually recognize the second display, the display control unit 103 stops displaying the second display (Step S25). On the other hand, in a case where the eye sensor 17 does not detect an object after performing the second display on the finder monitor 13, the determination unit 101 continues the second display on the finder monitor 13 (Step S24).

As described above, in the present embodiment, after the second display is performed on the finder monitor 13, the determination unit 101 determines whether or not the imaging person can visually recognize the second display, and, in a case where it is not determined that the second display can be visually recognized, the display of the second display is stopped. As a result, the imaging apparatus 10 can efficiently perform the second display, and the consumption of the battery of the imaging apparatus 10 can be suppressed. In addition, in a case where the finder monitor 13 is composed of an OLED, deterioration of the finder monitor 13 can be suppressed.

In the embodiment, the hardware structures of processing units executing various kinds of processing are the following various processors. The various processors include, for example, a central processing unit (CPU) which is a general-purpose processor that executes software (program) to function as various processing units, a programmable logic device (PLD) which is a processor whose circuit configuration can be changed after manufacturing such as a field programmable gate array (FPGA), and a dedicated circuitry which is a processor having a circuit configuration specifically designed to execute specific processing such as an application specific integrated circuit (ASIC).

One processing unit may be constituted by one of the various processors or may be constituted by a combination of two or more processors of the same type or different types (for example, a plurality of FPGAs or a combination of the CPU and the FPGA). A plurality of processing units may be constituted by one processor. As an example in which the plurality of processing units are constituted by one processor, first, as represented by a computer such as a client or a server, one processor is constituted by a combination of one or more CPUs and software and this processor functions as the plurality of processing units. Second, as represented by a system on chip (SoC), a processor that realizes the functions of the entire system including the plurality of processing units by using one integrated circuit (IC) chip is used. As described above, the various processing units are constituted by using one or more of the above described various processors as a hardware structure.

The hardware structure of these various processors is more specifically an electric circuit (circuitry) in which circuit elements such as semiconductor elements are combined.

Each of the above-described configurations and functions can be appropriately realized by any hardware, software, or a combination of both. For example, the present invention can be applied to a program causing a computer to execute the above-described processing steps (processing procedures), a computer-readable recording medium (non-transitory recording medium) on which such a program is recorded, or a computer on which such a program can be installed.

<Other Examples of Second Display>

Next, another example of the second display will be described. In the above-mentioned example, an example in which information is reported to the imaging person by the surface display of two different colors is described. However, the second display of the present invention is not limited to this. Another example of the second display will be described below.

(Another Example 1 of Second Display)

In another example 1 of the second display, the display control unit 103 reports information to the imaging person by performing surface display of three or more colors on the finder monitor 13.

For example, a difference in the focus position of the focus area is displayed by the surface display of three different colors by the second display. For example, by the surface display, a state in which the focus position is shifted to the front of the focus position on the subject is displayed in blue, a state in which the focus position is at a position to focus on the subject is displayed in green, and a state in which the focus position is shifted to the back from the focus position on the subject is displayed in red. In addition, the color of the surface display may be changed according to the volume of the microphone connected to the imaging apparatus 10. For example, in a case where the volume is low, the surface display of green is performed, in a case where the volume is medium, the surface display of yellow is performed, and in a case where the volume is high, the surface display of red is performed. The color of the surface display may be changed based on the remaining amount of the recording medium. For example, in a case where the remaining amount of the recording medium is 100%, the surface display of green may be performed, in a case where the remaining amount of the recording medium is 0%, the surface display of red may be performed, and the color of the surface display may be gradually changed at the intermediate remaining amount. The color of the surface display may be changed based on the temperature of the camera. For example, the color of the surface display may be gradually changed such that the surface display of red is performed in a case where the temperature of the camera is high and the surface display of blue is performed in a case where the temperature of the camera is low. The color of the surface display may be changed based on the ISO sensitivity setting of the camera. For example, in a case where the ISO sensitivity is low, the surface display of blue may be performed, in a case where the ISO sensitivity is high, the surface display of red may be performed, and the color of the surface display may be gradually changed at the intermediate sensitivity. The color of the surface display may be gradually changed based on the color temperature setting of the white balance (WB) of the camera. For example, the surface display of red may be performed at a low color temperature, the surface display of blue may be performed at a high color temperature, and the color of the surface display may be gradually changed at an intermediate color temperature. The color of the surface display may be changed according to the size of an area of halation in the captured image. For example, the color of the surface display may be gradually changed such that the surface display of blue is performed in a case where the area of halation is small and the surface display of red is performed in a case where the area of halation is large.

In this way, by performing the surface display with three or more colors, it is possible to more accurately report information on the intensity and the position.

(Another Example 2 of Surface Display)

In another example 2 of the second display, the intensity of the information to be reported is represented by the blinking of the surface display or the brightness of the surface display.

For example, in a case where the low level of one information display is displayed in the surface display of green, the middle level thereof is displayed in the surface display of yellow, and the high level thereof is displayed in the surface display of red, the surface display of yellow is turned on in a case where the value is low in the middle level range, and the blinking is made faster and blinking interval is shortened as the value increases in the middle level range. Then, in a case where the level reaches a high level, the display is changed to the surface display of red, and the surface display is turned on at all times and blinks in the same manner as the surface display of yellow according to the value in the high level range. By reporting the information in such a form, it is possible to report a more detailed position at each level. For example, according to the present example, it is possible to accurately report which region the microphone level is located in, which is appropriate, too-low, or too-high. Even in a case where there is a slight difference in volume at the microphone level, sound can be recorded correctly in a case where it is within the appropriate level. On the other hand, in a case where the level is too-high, sound cracking occurs, and in a case where the level is too-low, sound is drowned in the noise and difficult to hear. Therefore, it is possible to appropriately collect sound by reporting which region the microphone level is located at each level as in the present example.

(Another Example 3 of Surface Display)

In another example 3 of the second display, the finder monitor 13 is divided into two regions and surface display is performed.

Figure 11:
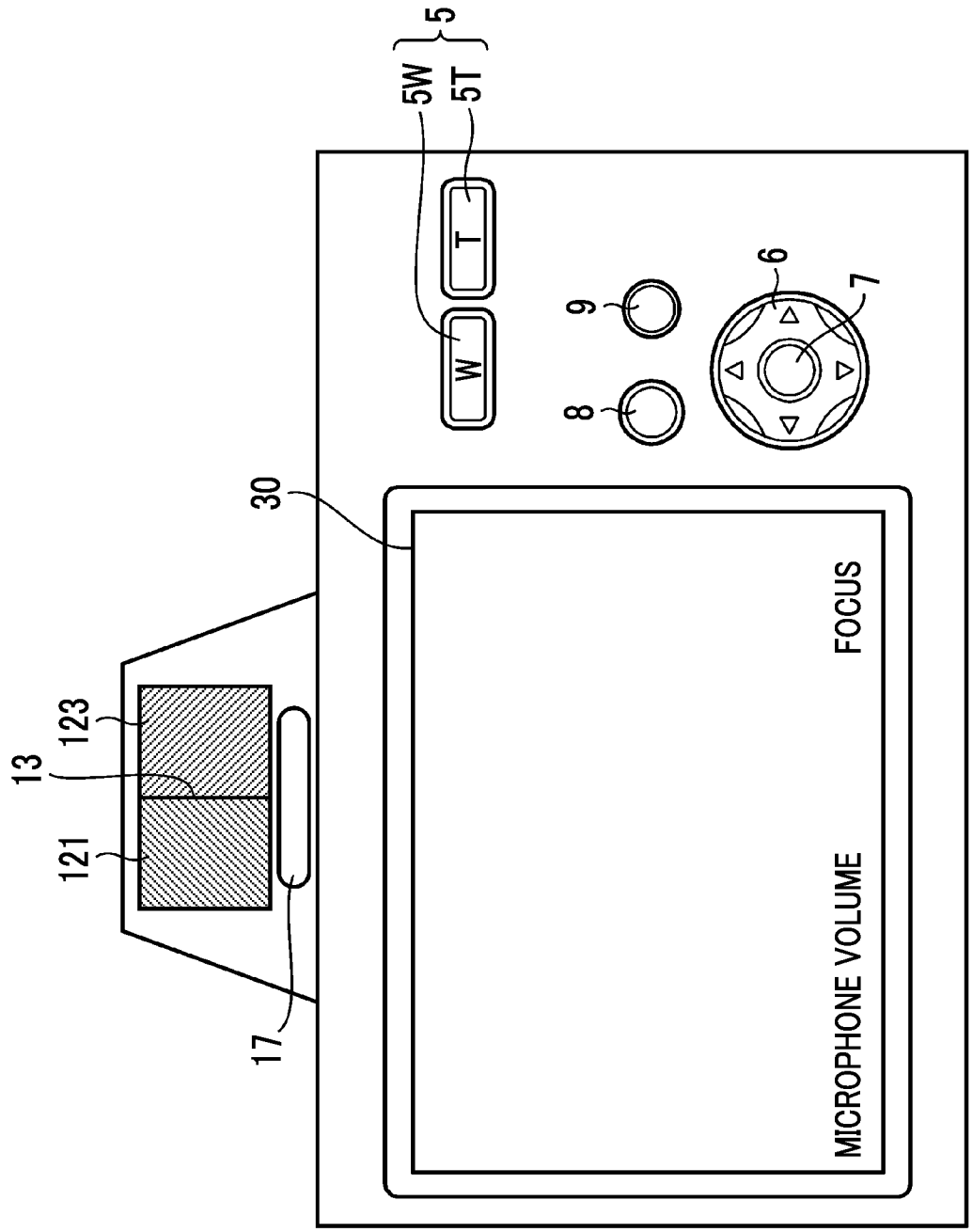
FIG. 11 is a diagram illustrating another example of the second display.

FIG. 11 is a diagram illustrating another example 3 of the second display. As shown in FIG. 11, the finder monitor 13 is vertically divided into two regions, a first display region 121 and a second display region 123. The surface display of different colors is performed in the first display region 121 and the second display region 123. For example, the surface display for reporting the information on the microphone volume is performed in the first display region 121, and the surface display for reporting the information on the focus is performed in the second display region 123. Then, contents of information reported by the second display of the divided two regions of the finder monitor 13 are reported on the rear monitor 30 as character information. Specifically, the characters "microphone volume" and "focus" are displayed on the rear monitor 30 in accordance with a positional relationship between the first display region 121 and the second display region 123 on the finder monitor 13. As a result, two kinds of information can be reported to the imaging person, and the imaging person can check the information reported by the second display performed in the first display region 121 and the second display region 123 as the character information. In the example shown in FIG. 11, a case where the finder monitor 13 is vertically divided into two regions is described, but the same effect can be obtained in a case where the finder monitor 13 is horizontally divided into two regions.

<Another Example of Stopping of Second Display>

In the second embodiment described above, an example of stopping the second display in a case where an object is detected by the eye sensor 17 after the second display is performed is described (Steps S23 and S25). However, in the embodiment of the present invention, there is another example in which the determination unit 101 does not determine that the imaging person can visually recognize the second display. For example, in a case where a display surface of the rear monitor 30 faces a direction different from that of the finder monitor 13, it can be estimated that the imaging person is located in a direction in which the display surface of the rear monitor 30 faces and is not in a position at which the finder monitor 13 can be observed from the front. In such a case, the determination unit 101 does not determine that the imaging person can visually recognize the second display.

FIGS. 12 and 13 are diagrams illustrating still another example in a case of stopping the second display. FIG. 12 is a diagram showing a case where the rear monitor 30 of a vari-angle type faces the same direction as the finder monitor 13. Since the finder monitor 13 has a narrow viewing angle, the imaging person cannot visually recognize the second display unless the imaging person views the finder monitor 13 from the front. Therefore, in a case where the rear monitor 30 faces the same direction as the finder monitor 13, the determination unit 101 determines that the imaging person can visually recognize the second display.

On the other hand, as shown in FIG. 13, in a case where the rear monitor 30 of a van-angle type does not face the same direction as the finder monitor 13, the determination unit 101 does not determine that the imaging person can visually recognize the second display. Then, the display control unit 103 stops the second display based on the result of the determination unit 101. For example, the imaging apparatus 10 comprises a display angle detection sensor 127 on the display surface of the rear monitor 30, and terminates the second display in a case where a detection result of the display angle detection sensor 127 exceeds a threshold value. As the display angle detection sensor 127, a sliding resistance type rotary position sensor or a magnetoresistive element type rotation angle detection sensor can be used.

As described above, in the present example, in a case where the imaging person is not located at the front to view the finder monitor 13, the second display on the finder monitor 13 is stopped. As a result, it is possible to suppress the consumption of the battery of the imaging apparatus 10, and it is possible to suppress the deterioration of an OLED in a case where the finder monitor 13 is composed of the OLED.

<Setting Using Menu Screen>

Next, setting of the second display will be described.

As described above, in the second display, various kinds of information can be transmitted to the imaging person. Then, the imaging person can set what kind of information is transmitted in the second display and whether to perform the second display on a menu screen.

FIG. 14 is a diagram showing a setting screen of the second display. A menu screen as shown in FIG. 14 is displayed on the rear monitor 30 or the finder monitor 13 under the control of the CPU 40.

The imaging person selects "EVF non-eye-contact information display setting" on a displayed menu screen 131, and the CPU 40 receives the selection. The menu screen 131 then transitions to an EVF non-eye-contact information display setting screen 133, and the CPU 40 receives the imaging person's selection regarding the information to be reported in the second display. In the case shown in FIG. 14, information on the focus and information on the microphone level are selected by touching the touch panel 31, and these kinds of information are reported by the second display. As a result, desired information of the imaging person can be reported by the second display.

Other Examples

In the above description, a case where the first display unit is the finder monitor 13 is described, but the first display unit of the present invention is not limited thereto. For example, the present invention can be applied to a monitor (top monitor and sub monitor) other than a main monitor (rear monitor 30), an external finder monitor, or the like.

The examples of the invention have been described above. However, the invention is not limited to the above-described embodiments, and various modifications can be made without departing from the gist of the invention.

EXPLANATION OF REFERENCES

1: flash
2: shutter button
3: power/mode switch
4: mode dial
5: zoom button
5T: telephoto button
5W: wide button
6: cross button
7: MENU/OK button
8: play button
9: BACK button
10: imaging apparatus
11: finder
12: imaging lens
13: finder monitor
14: stop
16: imaging element
17: eye sensor
20: external apparatus connection terminal
22: image input controller
24: image processing unit
26: compression/expansion processing unit
28: video encoder
30: rear monitor
31: touch panel
32: sensor driving unit
33: shutter driving unit
34: stop driving unit
36: lens driving unit
38: operation unit
40: CPU
47: ROM
48: memory
49: touch sensor input unit
51: posture/motion sensor
52: media controller
54: memory card
101: determination unit
103: display control unit

What is claimed is:

1. An imaging apparatus comprising:
a first display unit; and
a processor,
wherein the processor performs
a determination process for determining whether or not a display content of the first display unit is visually recognizable by a user, and
a display control for displaying a first display including at least one of a captured image or a character in a case where it is determined through the determination process that the display content is visually recognizable, and for causing the first display unit to display a second display which reports information using a surface display in a case where it is not determined through the determination process that the display content is visually recognizable.

2. The imaging apparatus according to claim 1, wherein the processor performs a surface display of color as the second display.

3. The imaging apparatus according to claim 1, wherein the processor performs a blinking surface display as the second display.

4. The imaging apparatus according to claim 1, wherein the second display is a display indicating a state related to imaging information.

5. The imaging apparatus according to claim 4, wherein the imaging information is setting information of the imaging apparatus or information on the captured image.

6. The imaging apparatus according to claim 4, wherein the imaging information is at least one of information on a focus control, information on a volume of a microphone, information on a memory, information on a temperature of the imaging apparatus, information on ISO sensitivity, information on white balance, or information on halation of an image.

7. The imaging apparatus according to claim 1, further comprising:
a second display unit,
wherein the processor causes the second display unit to display imaging information in a case where the first display unit performs the second display.

8. The imaging apparatus according to claim 7, wherein the second display unit has a display surface of which a display angle is changeable with respect to a display surface of the first display unit, and
the processor terminates the second display in a case where the display angle of the display surface of the second display unit exceeds a threshold value while the first display unit displays the second display.

9. The imaging apparatus according to claim 1, further comprising:

an object detection sensor that detects presence or absence of an object existing around the first display unit, wherein the processor makes determination according to a detection result of the object detection sensor in the determination process.

10. The imaging apparatus according to claim 9, wherein the processor terminates the second display in a case where the object detection sensor detects an object after starting the second display on the first display unit.

11. The imaging apparatus according to claim 10, wherein the object detection sensor is a proximity sensor that detects an object close to the first display unit.

12. The imaging apparatus according to claim 1, wherein the processor makes determination based on whether or not an external apparatus is connected to the imaging apparatus in the determination process.

13. The imaging apparatus according to claim 1, wherein the processor
receives selection of the information to be displayed in the second display, and
causes the first display unit to perform the second display related to the selected information.

14. The imaging apparatus according to claim 1, wherein the processor performs the second display in each of two regions into which a display surface of the first display unit is divided.

15. An imaging method performed using an imaging apparatus including a first display unit and a processor, the method comprising:

a determination process step, performed by the processor, of determining whether or not a display content of the first display unit is visually recognizable by a user; and a display control step, performed by the processor, of displaying a first display including at least one of a captured image or a character in a case where it is determined through the determination process step that the display content is visually recognizable, and of causing the first display unit to display a second display which reports information using a surface display in a case where it is not determined through the determination process step that the display content is visually recognizable.

16. A non-transitory, computer-readable tangible recording medium which records thereon a program which causes, when read by a computer, the computer to perform an imaging method performed using an imaging apparatus including a first display unit, the method comprising:

a determination process step of determining whether or not a display content of the first display unit is visually recognizable by a user; and.

a display control step of displaying a first display including at least one of a captured image or a character in a case where it is determined through the determination process step that the display content is visually recognizable, and of causing the first display unit to display a second display which reports information using a surface display in a case where it is not determined through the determination process step that the display content is visually recognizable.

\* \* \* \* \*